United States Patent [19]
Flueckinger

[11] Patent Number: 5,848,818
[45] Date of Patent: Dec. 15, 1998

[54] AUXILIARY ARTICLE COMPARTMENT FOR A PICKUP TRUCK, INCLUDING A RETRACTABLE CARGO COVER

[76] Inventor: Gary D. Flueckinger, R.R.1 Box 102, Gordon, Nebr. 69343

[21] Appl. No.: 885,525

[22] Filed: Jun. 30, 1997

[51] Int. Cl.⁶ .................................................. A62C 27/00
[52] U.S. Cl. ...................... 296/37.6; 296/98; 296/100.02
[58] Field of Search ........................ 296/37.6, 98, 100.02

[56] References Cited

U.S. PATENT DOCUMENTS

| | | | |
|---|---|---|---|
| 3,727,971 | 4/1973 | Sisler | 296/37.6 |
| 4,705,317 | 11/1987 | Henri | 296/37.6 |
| 4,789,195 | 12/1988 | Fletcher | 296/37.6 |
| 5,228,739 | 7/1993 | Love | 296/100.02 |
| 5,257,850 | 11/1993 | Brim | 296/98 |

*Primary Examiner*—Gary C. Hoge

[57] ABSTRACT

A boxmate including a generally rectangular housing member sized for positioning within a truck bed. The housing member has a compartmentalized interior. The housing member has an first side wall, a second side wall, an upper portion and a lower portion. The housing member has a closed rear end and a front end defining a pair of openings. The upper portion of the housing member has a generally rectangular opening. At least one j-hook bracket is provided and allows the first side wall of the housing member to be mounted to a first interior wall of the truck bed. Lastly, a tarp is mounted onto the second side wall of the housing member with a rotatable retaining means and is extendable to couple with a second truck rail of the truck bed.

6 Claims, 3 Drawing Sheets

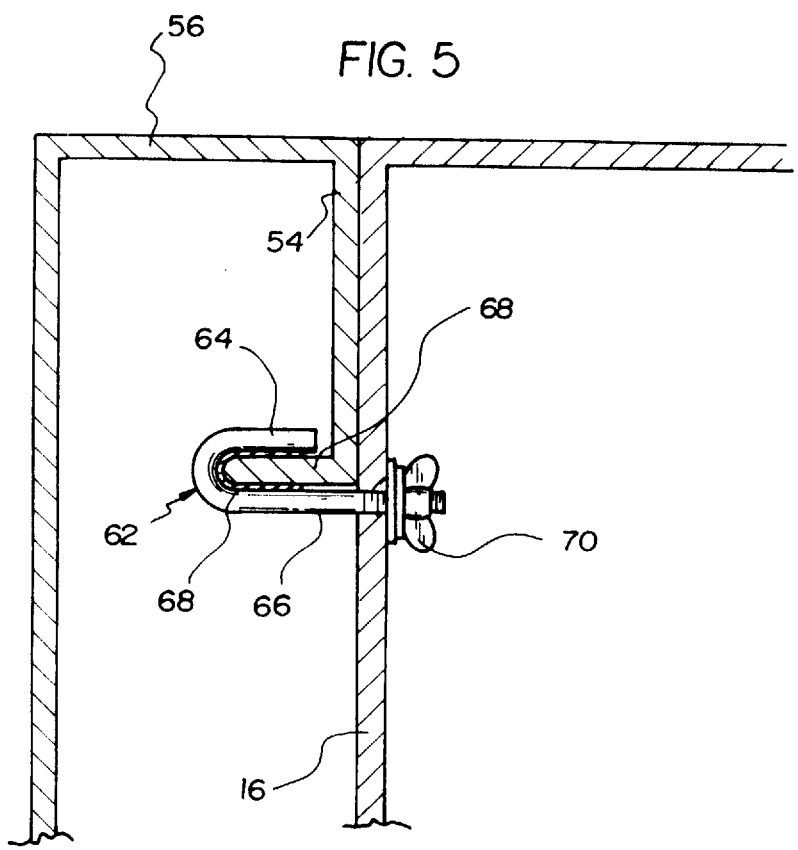
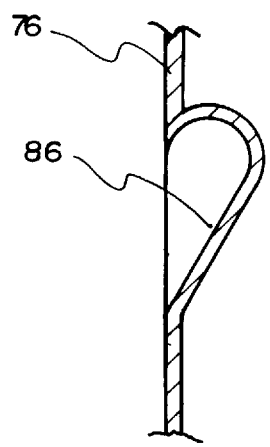

AUXILIARY ARTICLE COMPARTMENT FOR A PICKUP TRUCK, INCLUDING A RETRACTABLE CARGO COVER

BACKGROUND OF THE INVENTION

1. Field of the Invention

The present invention relates to a boxmate and more particularly pertains to providing a storage box for a truck bed of a pickup truck and further including a tarp to protect other items in the truck bed.

2. Description of the Prior Art

The use of a truck bed storage box is known in the prior art. More specifically, truck bed storage boxes heretofore devised and utilized for the purpose of storing items such as tools are known to consist basically of familiar, expected and obvious structural configurations, notwithstanding the myriad of designs encompassed by the crowded prior art which have been developed for the fulfillment of countless objectives and requirements.

By way of example, the prior art includes U.S. Pat. No. 5,421,645 to Young discloses modular compartments for utility vehicles. U.S. Pat. No. 5,398,987 to Sturgis discloses a tool box assembly. U.S. Pat. No. 5,299,722 to Cheney discloses a double lid truck storage box. U.S. Pat. No. Des. 305,315 to Fletcher discloses a truck tool box. U.S. Pat. No. 4,789,195 to Fletcher discloses a truck tool box. Lastly, U.S. Pat. No. 4,215,896 to Drouin discloses a box for a pick-up vehicle.

In this respect, the boxmate according to the present invention substantially departs from the conventional concepts and designs of the prior art, and in so doing provides an apparatus primarily developed for the purpose of providing a storage box for a truck bed of a pickup truck and further including a tarp to protect other items in the truck bed.

Therefore, it can be appreciated that there exists a continuing need for a new and improved boxmate which can be used for providing a storage box for a truck bed of a pickup truck and further including a tarp to protect other items in the truck bed. In this regard, the present invention substantially fulfills this need.

SUMMARY OF THE INVENTION

In view of the foregoing disadvantages inherent in the known types of truck bed storage boxes now present in the prior art, the present invention provides an improved boxmate. As such, the general purpose of the present invention, which will be described subsequently in greater detail, is to provide a new and improved boxmate which has all the advantages of the prior art and none of the disadvantages.

To attain this, the present invention essentially comprises a generally rectangular housing member that has a compartmentalized interior. The housing member has a first side wall, a second side wall, an upper portion and a lower portion. The housing member has a closed rear end and a front end defining a pair of openings. The upper portion of the housing member has a generally rectangular opening defining an entry into a first compartment of the housing. The pair of openings of the front end providing an entry into a second and third compartment of the housing member. The housing member is sized for positioning within a truck bed with the lower portion positioned about the wheel well. The first side wall of the housing member is flush with a first interior wall of a first truck rail of the truck bed. The rear end of the housing member is flush with a rear wall of the truck bed. Also, at least one j-hook bracket is provided. The j-hook bracket has a first portion and a second portion. The first portion is hooked around a flange of the first interior wall of the truck rail. The second portion passes through the first side wall of the housing member. The second portion receives a nut for securing the j-hook bracket in place and allows the first side wall to be mounted to the interior wall of the truck bed. Additionally, included are a pair of drawers. The pair f drawers form an upper drawer and a lower drawer. The upper drawer is sized for positioning within the second compartment of the housing member. The lower drawer is sized for positioning within the third compartment of the housing member. Each drawer has a front face with a locking mechanism attached thereto for allowing the complementary drawer to be locked within the respective compartment of the housing member. Lastly, a tarp is mounted onto the second side wall of the housing member with a rotatable retaining means. The tarp has a horizontal end edge with a plurality of snap-like couplers attached. The tarp is extendable from within the rotatable retaining means for coupling with a second truck rail of the truck bed.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved boxmate which has all the advantages of the prior art truck bed storage boxes and none of the disadvantages.

It is another object of the present invention to provide a new and improved boxmate which may be easily and efficiently manufactured and marketed.

It is a further object of the present invention to provide a new and improved boxmate which is of a durable and reliable construction.

An even further object of the present invention is to provide a new and improved boxmate which is susceptible of a low cost of manufacture with regard to both materials and labor, and which accordingly is then susceptible of low prices of sale to the consuming public, thereby making such Boxmate economically available to the buying public.

Still yet another object of the present invention is to provide a new and improved boxmate which provides in the apparatuses and methods of the prior art some of the advantages thereof, while simultaneously overcoming some of the disadvantages normally associated therewith.

Still another object of the present invention is to providing a storage box for a truck bed of a pickup truck and further including a tarp to protect other items in the truck bed.

Lastly, it is an object of the present invention to provide a new and improved truck bed storage box that has a generally rectangular housing member sized for positioning within a truck bed. The housing member has a compartmentalized interior. The housing member has an first side wall, a second side wall, an upper portion and a lower portion. The housing member has a closed rear end and a front end defining a pair of openings. The upper portion of the housing member has a generally rectangular opening. At least one j-hook bracket is provided and allows the first side wall of the housing member to be mounted to a first interior wall of the truck bed. Lastly, a tarp is mounted onto the second side wall of the housing member with a rotatable retaining means and is extendable to couple with a second truck rail of the truck bed.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 5 is a cross-sectional view of the housing member mounted to the truck bed taken along lines 5—5 of FIG. 1.

FIG. 6 is a cross-sectional view of the handle of the drawers taken along lines 6—6 of FIG. 3.

Similar reference characters refer to similar parts throughout the several views of the drawings.

DESCRIPTION OF THE PREFERRED EMBODIMENT

Figure 1:
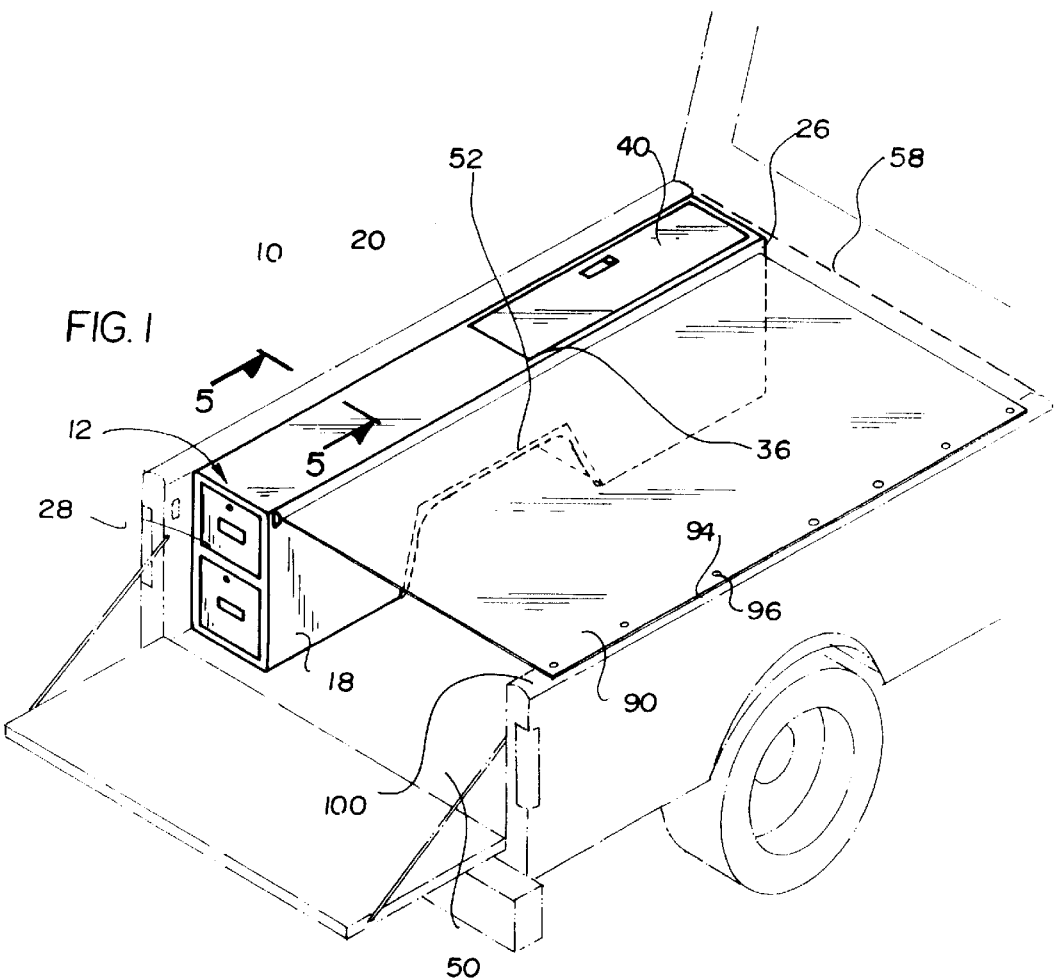
FIG. 1 is a perspective illustration of the preferred embodiment of the boxmate constructed in accordance with the principles of the present invention.

With reference now to the drawings, and in particular to FIG. 1 thereof, a new and improved boxmate embodying the principles and concepts of the present invention and generally designated by the reference numeral 10 will be described.

The present invention, the new and improved Boxmate, is comprised of a plurality of components. Such components in their broadest context include a housing member, drawers and a bracket. Such components are individually configured and correlated with respect to each other so as to attain the desired objective.

Figure 2:
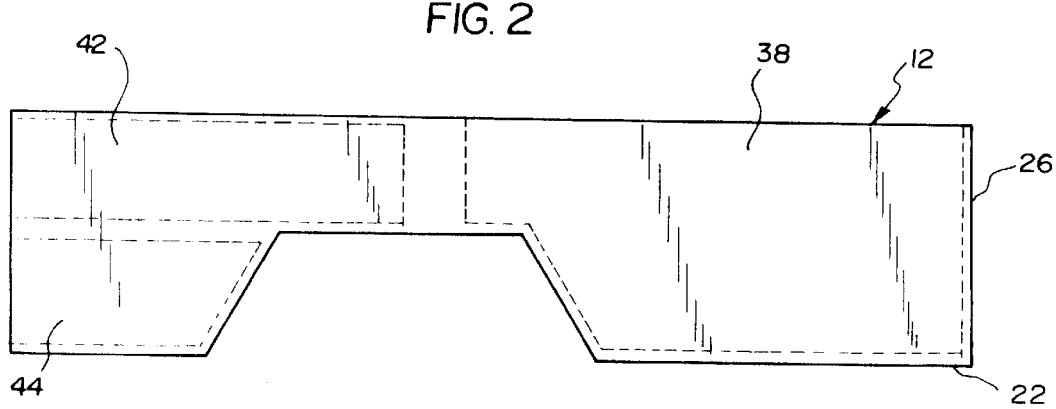
FIG. 2 is a side elevational view of the boxmate of the present invention.

More specifically, the present invention includes a generally rectangular housing member 12 as seen in FIG. 1. The housing member is formed of a molded polyethylene and has a compartmentalized interior, as depicted in FIG. 2. The housing member has a first side wall 16, a second side wall 18, an upper portion 20 and a lower portion 22. The housing member has a closed rear end 26 and a front end 28 defining a pair of openings 32 and 34. The upper portion of the housing member has a generally rectangular opening 36 defining an entry into a first compartment 38 of the housing member. The opening is enclosed with a lid 40 that is rotatable back and forth about an edge of the opening. The pair of openings of the front end providing an entry into a second 42 and third 44 compartment of the housing member.

As best illustrated in FIG. 1, the housing member is sized for positioning within a truck bed 50 with the lower portion positioned about a wheel well 52. The first side wall of the housing member is flush with a first interior wall 54 of a first truck rail 56 of the truck bed. FIG. 5 shows the placement of the first side wall against the first interior wall. The rear end 26 of the housing member is flush with a rear wall 58 of the truck bed.

Also, at least one j-hook bracket 62 is provided, as shown in FIG. 5. Preferably three to five brackets are used. The j-hook bracket has a first portion 64 and a second portion 66. The first portion is hooked around a flange 68 of the first interior wall 54 of the truck rail. The flange is coated with a rubberized material 68 so as to provide a non-slip surface for J-hook to clamp onto. The second portion passes through the first side wall 16 of the housing member. The second portion receives a nut 70 for securing the j-hook bracket in place. Preferably the nut is a wing nut. Securement of the J-hook bracket allows the first side wall to be mounted to the interior wall of the truck bed.

Figure 3:
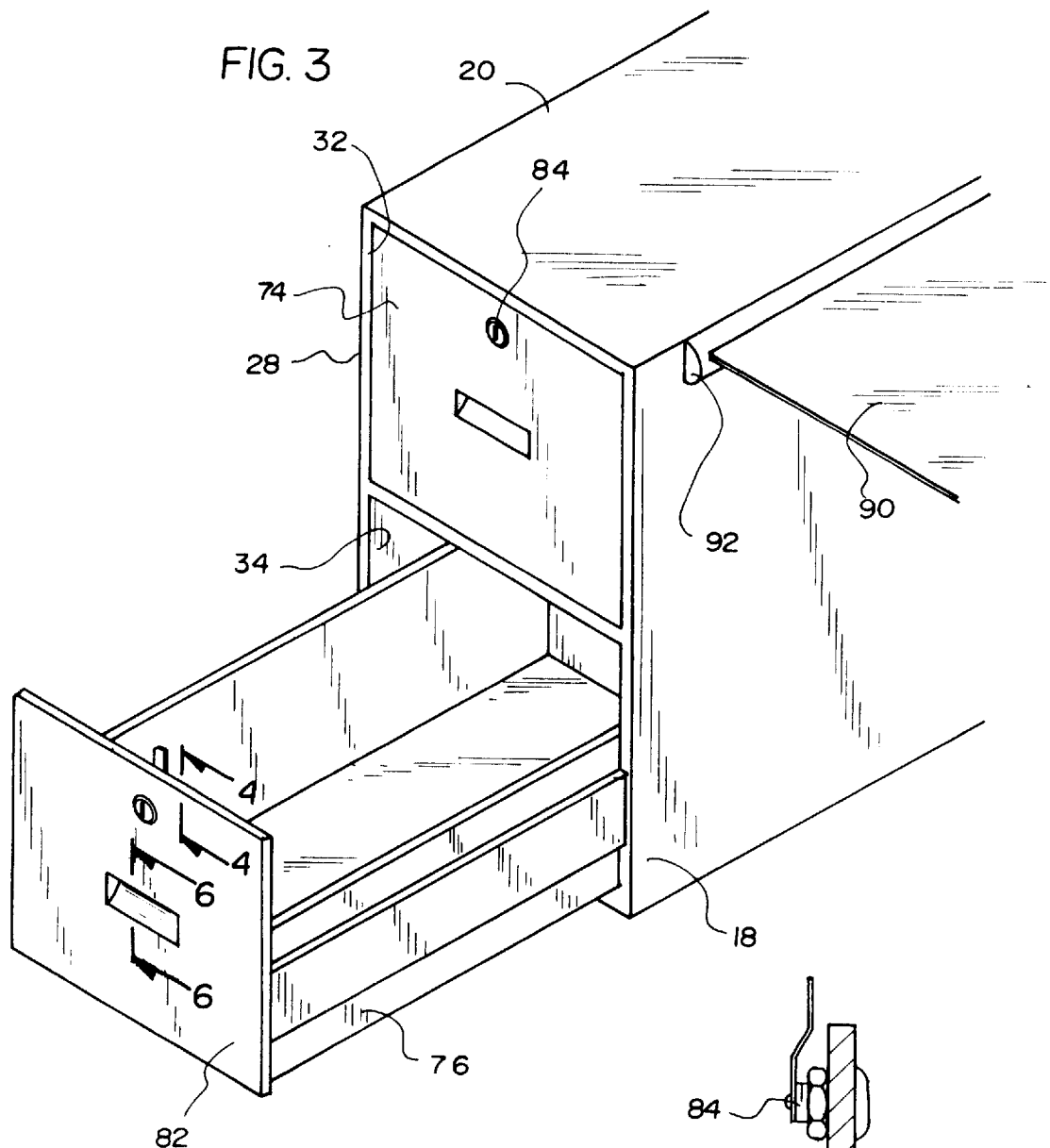
FIG. 3 is an enlarged view of the housing member with a pair of the drawers.
Figure 4:
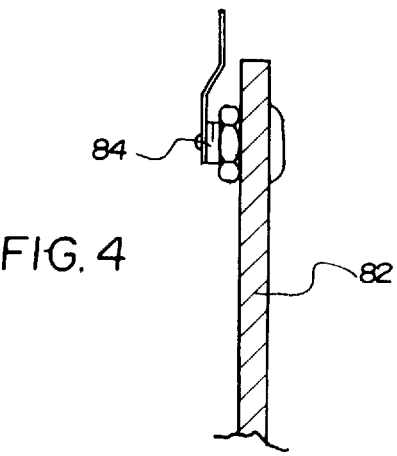
FIG. 4 is an enlarged cut-away view of the locking mechanism taken along lines 4—4 of FIG. 3.

Additionally, included are a pair of drawers, as shown in FIG. 3. The pair of drawers form an upper drawer 74 and a lower drawer 76. The upper drawer is sized for positioning within the second compartment 32 of the housing member. The lower drawer is sized for positioning within the third compartment 34 of the housing member. Each drawer is slidable in and out of their respective compartment. Each drawer has a front face 82 with a locking mechanism attached 84. The locking mechanism, as seen in FIG. 4, allows the complementary drawer to be locked within the respective compartment of the housing member. Each drawer has a slotted area 86 functioning as a handle for pulling the drawer in and out of the compartment.

Lastly, a tarp 90 is mounted onto the second side wall 18 of the housing member with a rotatable retaining means 92. The tarp has a horizontal end edge 94 with a plurality of snap-like couplers 96 attached. The rotatable retaining means is a commercially available spring operated mechanism similar to the type used with shades. The tarp is water proof. The tarp is extendable from within the rotatable retaining means for coupling with a second truck rail 100 of the truck bed.

The present invention boxmate may be produced as a single structure as depicted in the drawings or a divided structure. The divided would be produced in two separate pieces, allowing for the purchase of one piece at a time. The boxmate has a storage box with top access, a long drawer with a sliding drawer, and a short drawer, also with a sliding drawer. All three compartments have locking latch closures. Boxmate will attach to the truck bed via a J-hook shaped metal bracket on the flange of the interior wall of the truck rail bed. The second portion of the bracket has a threaded screw to affix a wing nut and washer assembly.

Included with the housing member is a built-in weather resistant tarp. The tarp is wrapped around a spring loaded roller which allows the tarp to be rolled and unrolled, similar to a window shade. The front of the opening where the tarp is located is sealed by a soft rubber strip to prevent rain and dirt from entering the opening. The tarp will snap on the second truck rail of the truck bed.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A new and improved boxmate for use in a truck bed of a pickup truck comprising in combination:

a generally rectangular housing member having a compartmentalized interior, the housing member having an first side wall, a second side wall, an upper portion and a lower portion, the housing member having a closed rear end and a front end defining a pair of openings, the upper portion of the housing member having a generally rectangular opening defining an entry into a first compartment of the housing, the pair of openings of the front end providing an entry into a second and third compartment of the housing member;

the housing member being sized for positioning within a truck bed with the lower portion positioned about the wheel well, the first side wall of the housing member being flush with a first interior wall of a first truck rail of the truck bed, the rear end of the housing member being flush with a rear wall of the truck bed;

at least one j-hook bracket having a first portion and a second portion, the first portion being hooked around a flange of the first interior wall of the truck rail, the second portion passing through the first side wall of the housing member, the second portion receiving a nut for securing the j-hook bracket in place and allowing the first side wall to be mounted to the interior wall of the truck bed;

a pair of drawers forming an upper drawer and a lower drawer, the upper drawer being sized for positioning within the second compartment of the housing member, the lower drawer being sized for positioning within the third compartment of the housing member, each drawer having a front face with a locking mechanism attached thereto for allowing the complementary drawer to be locked within the respective compartment of the housing member; and a tarp being mounted onto the second side wall of the housing member with a rotatable retaining means, the tarp having a horizontal end edge with a plurality of snap-like couplers attached thereto, the tarp being extendable from within the rotatable retaining means for coupling with a second truck rail of the truck bed.

2. A boxmate comprising:

a generally rectangular housing member sized for positioning within a truck bed, the housing member having a compartmentalized interior, the housing member having an first side wall, a second side wall, an upper portion and a lower portion, the housing member having a closed rear end and a front end defining a pair of openings, the upper portion of the housing member having a generally rectangular opening;

at least one j-hook bracket for allowing the first side wall of the housing member to be mounted to a first interior wall of the truck bed; and a tarp being mounted onto the second side wall of the housing member with a rotatable retaining means and extendable to couple with a second truck rail of the truck bed;

wherein the J-hook bracket having a first portion and a second portion, the first portion being hooked around a flange of the first interior wall of the truck rail, the second portion passing through the first side wall of the housing member, and the second portion receiving a nut for securing the j-hook bracket in place about the flange and within the first side wall.

3. The boxmate as set forth in claim 2, wherein the rectangular opening of the upper portion of the housing member defining an entry into a first compartment of the housing, and the pair of openings of the front end providing an entry into a second and third compartment of the housing member.

4. The boxmate as set forth in claim 2, wherein the lower portion of the housing member being sized for positioning about a wheel well of the truck bed, the first side wall of the housing member being flush with the first interior wall of a first truck rail of the truck bed, and the rear end of the housing member being flush with a rear wall of the truck bed.

5. The boxmate as set forth in claim 3, including a pair of drawers forming an upper drawer and a lower drawer, the upper drawer being sized for positioning within the second compartment of the housing member, and the lower drawer being sized for positioning within the third compartment of the housing member.

6. The boxmate as set forth in claim 5, wherein each drawer having a front face with a locking mechanism attached thereto for allowing the complementary drawer to be locked within the respective compartment of the housing member.

* * * * *